REAR SUSPENSION SYSTEM FOR A MOTOR VEHICLE

Filed June 27, 1967 2 Sheets-Sheet 1

INVENTOR.
ACHILLE C. SAMPIETRO
BY John R. Faulkner
Clifford L. Sadler
ATTORNEYS

REAR SUSPENSION SYSTEM FOR A MOTOR VEHICLE
Filed June 27, 1967 2 Sheets-Sheet 2
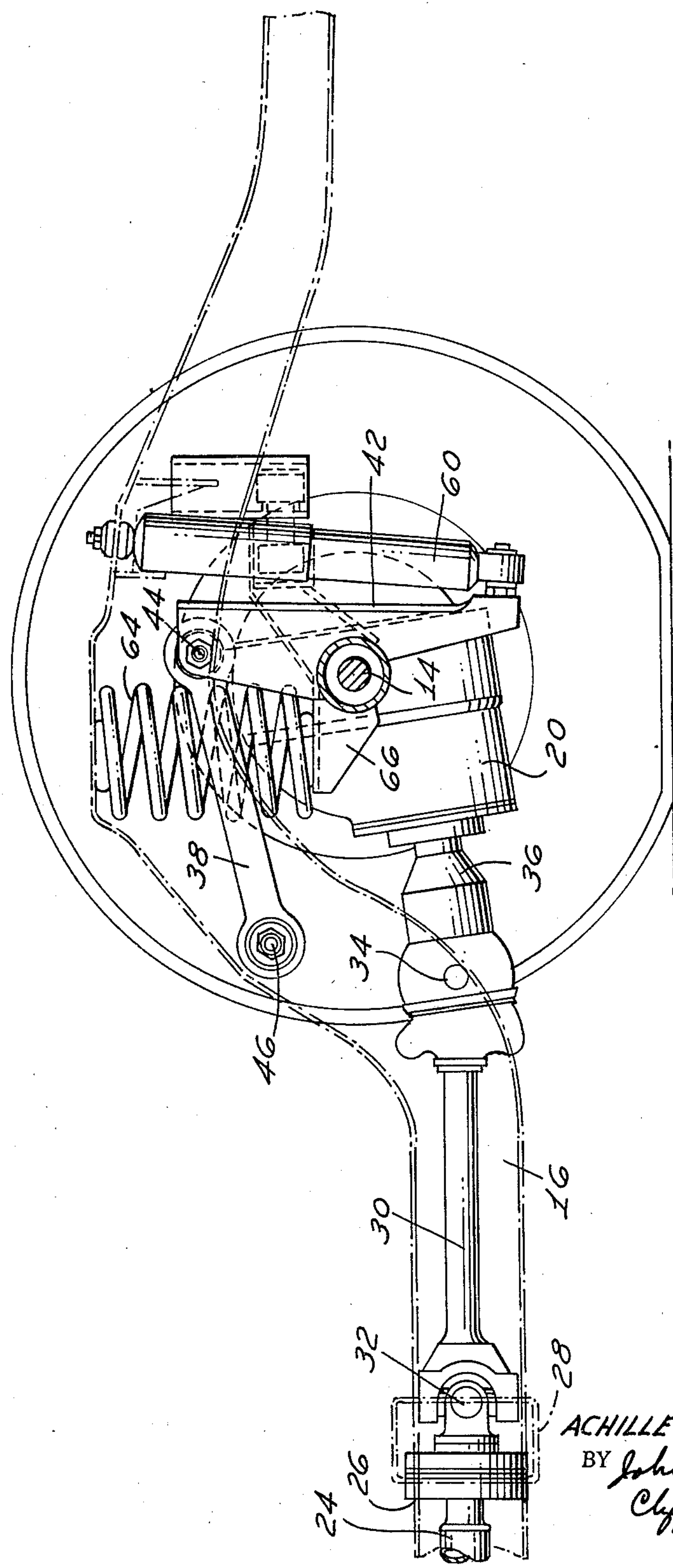
INVENTOR.
ACHILLE C. SAMPIETRO
BY John R. Faulkner
Clifford L. Sadler
ATTORNEYS United States Patent Office 3,497,028

Patented Feb. 24, 1970

1

3,497,028

REAR SUSPENSION SYSTEM FOR A MOTOR VEHICLE

Achille C. Sampietro, Bloomfield Hills, Mich., assignor to Ford Motor Company, Dearborn, Mich., a corporation of Delaware Filed June 27, 1967, Ser. No. 649,220
Int. Cl. B60k 17/00
U.S. Cl. 180—71 9 Claims

ABSTRACT OF THE DISCLOSURE

A rear suspension system for a motor vehicle having a solid rear axle housing positioned by a pair of conventional suspension links and a jointed nonextensible drive shaft. The drive shaft performs the dual function of transmitting torque to the differential and of positioning the axle.

BACKGROUND OF THE INVENTION

In a motor vehicle having a rigid axle housing interconnecting the driving wheels, it is necessary to provide means for resisting rotation of the axle housing during acceleration and braking. Several ways are suggested in the prior art. In a Hotchkiss rear suspension, the axle housing is clamped to the middle of longitudinally extending leaf springs and the leaf springs resist rotation of the axle housing. In a coil spring suspension, it is not uncommon to provide a pair of trailing arms and one or two upper arms that are pivotally connected to the axle housing. In combination, these arms determine the longitudinal position of the axle housing and absorb torque reaction occurring during acceleration of braking.

The present invention provides a unique linkage type suspension system for positioning an axle and preventing its rotation in which a jointed drive shaft is nonextensible and performs the dual function of delivering driving torque and of functioning as a suspension arm or link.

BRIEF SUMMARY OF THE INVENTION

In accordance with the preferred embodiment of the present invention, a rear suspension system for a motor vehicle having a rigid axle housing that journals left and right driving wheels is provided. A pair of longitudinally extending upper suspension arms or links are pivotally connected to the chassis frame and to the axle housing. The axle housing contains differential gearing from which a pinion shaft extends forwardly at a slightly downward angle. The driveline connecting the engine with the pinion shaft includes a nonextensible shaft section having a first universal joint connected to the forward section of the driveline and a second universal joint connected to the end of the pinion shaft. A thrust bearing journals the driveline adjacent to the forward or first universal joint and permits the nonextensible shaft section to function as a suspension link.

This construction has the advantage of reducing the suspension parts by providing a drive shaft that performs both a power transmitting and a suspension link function. The height of the tunnel and the vehicle floor pan is held to a minimum because the axle housing is precisely controlled by the two suspension arms and the driving shaft section.

BRIEF DESCRIPTION OF THE DRAWINGS

The many objects and advantages of the present invention will become amply apparent upon consideration of the following detailed discussion and the accompanying drawings in which.

Figure 1:
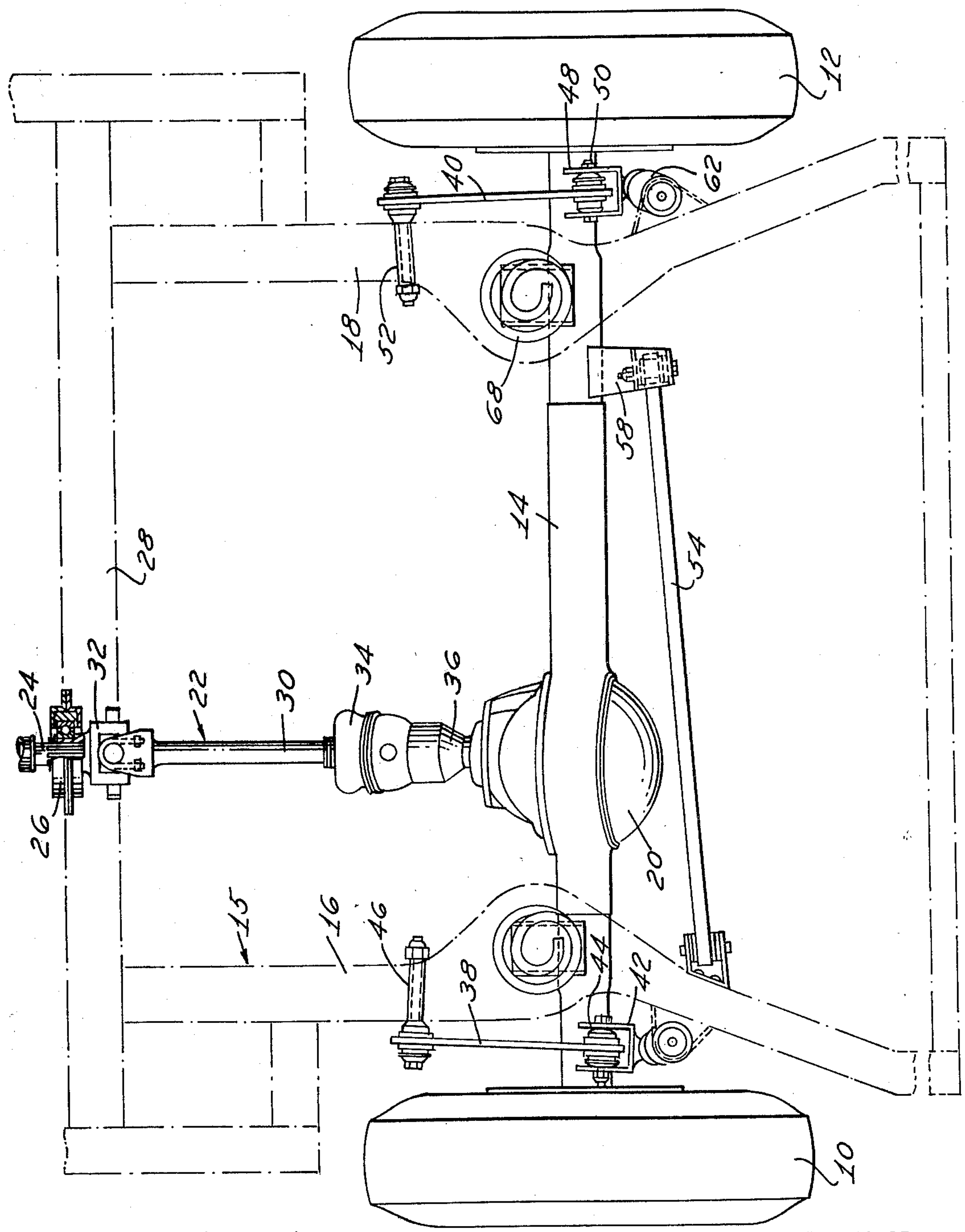
FIGURE 1 is a top plan view of the rear suspension

2 system for a motor vehicle incorporating the presently preferred embodiment of this invention, and FIGURE 2 is a side elevational view of the suspension system of FIGURE 1.

DETAILED DESCRIPTION OF THE INVENTION

Referring now to the drawings for a more complete understanding of this invention, FIGURE 1 illustrates a rear suspension incorporating the presently preferred embodiment of this invention. Left and right driving wheels 10 and 12 are journalled at the outer ends of a laterally extending rigid axle housing 14. A vehicle frame 15 having left and right side rails 16 and 18 is situated adjacent to the wheels 10 and 12.

Novel suspension means is provided in accordance with this invention for connecting the axle housing 14 to the frame assembly 15.

The axle housing 12 incorporates a differential housing 20 that contains conventional differential gearing (not shown) connected to the usual axle shafts (not shown) situated within the housing 14. A driveline assembly 22 connects the engine of the vehicle with the gearing in the differential housing 20. The driveline assembly 22 includes a shaft member 24 having its forward end connected to the power plant and its rearward end supported by an antifriction bearing 26. The bearing 26 is mounted on a frame cross member 28 that extends between the frame side rails 16 and 18.

A driveline shaft portion 30 has its forward end connected to the rear terminus of shaft 24 by means of a universal joint 32. The joint 32 is situated just rearwardly of the bearing 26. A universal joint 34 connects the rear end of shaft 30 with the pinion shaft 36 extending from the differential housing 20.

The shaft 30 and the joints 32 and 34 are nonextensible so that the shaft 30 may function as a suspension link to determine the longitudinal position of the axle housing 14. The bearing 26 is constructed to absorb the thrust loads exerted by the shaft 30 when it is functioning as a suspension link during acceleration and braking.

The axle housing 14 is also positioned by left and right suspension arms 38 and 40. A channel-shaped bracket 42 is welded to the axle housing 14 near its left-hand end and extends upwardly therefrom. A pivot pin 44 joins the rear end of a left suspension arm 38 with the bracket 42. A cantilever pin 46 provides a pivotal connection between the forward end of the link 38 and the frame side rail 16. In a similar fashion, a channel-shaped bracket 48 is welded to the right-hand end of the axle housing 14 and is pivotally connected to the right suspension arm 40 by means of a pivot assembly 50. A cantilever pin 52 provides a pivotal connection between the forward end of the arm 40 and the frame side rail 18.

The lateral position of the axle housing 14 is determined by a panhard rod 54. As seen in FIGURE 1, the left end of the rod 54 is pivotally connected to a frame bracket 56 while the right end is pivotally connected to axle housing bracket 58.

Spring means is provided to resiliently support the chassis frame 15 on the axle 14 and wheels 10 and 12. For this purpose, a coil suspension spring 64 is interposed between a spring seat formed on the left side rail 16 and a spring bracket 66 welded to the axle housing 14. A right coil spring 68 is interposed between the right rail 18 and a bracket welded to the axle housing 14.

Damping means is provided to control the relative movement between the frame 15 and axle 14. The right-hand channel-shaped bracket 42 has a lower extremity situated beneath the axle housing 14 that provides an attachment means for connection with the lower end of a telescopic shock absorber 60. The upper end of the left shock absorber 60 is bolted to the frame side rail 16. A right shock obsorber 62 is connected to the lower ends of the right-hand bracket 48 and to the right-hand frame side rail 18.

OPERATION

A suspension according to this invention has many distinct advantages. The suspension is a simplified design because the number of conventional suspension links is greatly reduced in number. The drive shaft component 30 performs the dual functioning of transmitting driving torque to the differential gearing and of positioning the axle housing. Thus, the drive shaft 30 and suspension arms 38 and 40 form a suspension linkage system that positions the axle housing 14 longitudinally and combine to resist axle housing rotation during acceleration and braking.

It will be noted in the side elevational view that the angle of the pinion shaft extending from the differential housing 20 is in a slightly downward and forward direction. A tilting of the differential in this fashion reduces the intrusion of the differential housing into the passenger compartment so that the normal tunnel in the floor pan may be of reduced size. In FIGURE 1, it is also to be noted that the differential housing 20 is situated to the left side of the centerline of the frame 15. Because the differential is tipped, the tunnel may be of a minimum size and because it is positioned off-center the resultant minimum tunnel may be situated between the left and center passenger. This arrangement permits greater comfort for the center passenger in the rear seat.

It will also be observed in the side elevational view of FIGURE 2 that the upper suspension arms 38 and 40 are sloped downwardly and forwardly along an inclined plane which contains an axis intersecting the longitudinal axis of the lower suspension link (the drive shaft portion 30). The convergence of these link axes provides forces which tend to reduce squatting during acceleration and lifting during braking.

The foregoing description presents the presently preferred embodiment of this invention. Modifications and alterations may occur to those skilled in the art that will come within the scope and spirit of the invention.

I claim:

1. A motor vehicle suspension system having an axle housing, a pair of wheels journalled at the outer ends of said axle housing, said axle housing having a differential means connected to said wheels, a chassis frame, first and second suspension means connected to said frame and to said axle housing and constructed to position said axle housing longitudinally with respect to said frame, a portion of one said suspension means being disposed above the axis of said axle housing and a portion of the other of said suspension means being disposed below the axis of said axle housing, said first suspension means comprising an articulated nonextensible driveline, said driveline having one end connected to said differential means and its other end constructed to be connected to a vehicle power plant, support means constructed to support a portion of said driveline on said chassis frame and to prevent longitudinal displacement therebetween, said articulated driveline comprising a shaft member connected to said differential means by a universal joint.

2. A motor vehicle suspension system according to claim 1 and including:

said second suspension means including a pair of suspension arms each having one end pivotally connected to said axle housing and its other end pivotally connected to said frame.

3. A motor vehicle suspension system according to claim 1 and including:

said articulated driveline comprising a second shaft member, said support means supporting said second shaft member on said chassis frame, said first mentioned shaft member being joined to said second shaft member by a second universal joint, said first mentioned shaft member and said first mentioned and second universal joints being nonextensible and constructed to position said axle housing longitudinally with respect to said frame.

4. A motor vehicle suspension system according to claim 1 and including:

said articulated driveline comprising a second shaft member, said support means comprising thrust bearing means supporting said second shaft member on said chassis frame, said first mentioned shaft member being joined to said second shaft member by a second universal joint, said first mentioned shaft member and said first mentioned and second universal joints being nonextensible and constructed to position said axle housing longitudinally with respect to said frame, said second suspension means including a pair of suspension arms each having one end pivotally connected to said axle housing and its other end pivotally connected to said frame, said differential means being disposed to one lateral side of the centerline of said frame.

5. A motor vehicle suspension system having an axle housing, a pair of wheels journalled at the outer ends of said axle housing, said axle housing having a differential means connected to said wheels, a chassis frame, first and second suspension means connected to said frame and to said axle housing and constructed to position said axle housing longitudinally with respect to said frame, a portion of one of said suspension means being disposed above the axis of said axle housing and a portion of the other of said suspension means being disposed below the axis of said axle housing, said first suspension means comprising an articulated nonextensible driveline, said driveline having one end connected to said differential means and its other end constructed to be connected to a vehicle power plant, support means constructed to support a portion of said driveline on said chassis frame and to prevent longitudinal displacement therebetween, said second suspension means also including a pair of suspension arms each having one end pivotally connected to said axle housing and its other end pivotally connected to said frame.

6. A motor vehicle suspension system having an axle housing, a pair of wheels journalled at the outer ends of said axle housing, said axle housing having a differential means connected to said wheels, a chassis frame, first and second suspension means connected to said frame and to said axle housing and constructed to position said axle housing longitudinally with respect to said frame, a portion of one of said suspension means being disposed above the axis of said axle housing and a portion of the other of said suspension means being disposed below the axis of said axle housing, said first suspension means comprising an articulated nonextensible second shaft, said driverline comprising a rotatable first shaft, a universal joint connecting first shaft to said differential means, a second rotatable shaft having one end constructed to be connected to a vehicle power plant, universal joint means connecting said first and second shafts, support means constructed to support a portion of said second shaft on said chassis frame and to prevent longitudinal displacement of said first shaft.

7. A motor vehicle suspension system according to claim 6 and including:

said second suspension means including a pair of suspension arms each having one end pivotally connected to said axle housing and its other end pivotally connected to said frame.

8. A motor vehicle suspension system according to claim 6 and including:

said support means comprising thrust bearing means supporting said second shaft on said chassis frame.

9. A motor vehicle suspension system according to claim 6 and including:

said support means comprising thrust bearing means supporting said second shaft on said chassis frame, said second suspension means including a pair of suspension arms each having one end pivotally connected to said axle housing and its other end pivotally connected to said frame.

References Cited

UNITED STATES PATENTS 2,102,415 12/1937 Herreshoff.
2,182,248 12/1939 Chayne ------------- 180—73
2,919,760 1/1960 Fehlberg et al. ------- 180—73
2,939,540 6/1960 Halberg et al. -------- 180—70

FOREIGN PATENTS 268,720 10/1929 Italy.

A. HARRY LEVY, Primary Examiner